(12) United States Patent
Dietz et al.

(10) Patent No.: US 6,771,768 B2
(45) Date of Patent: Aug. 3, 2004

(54) REAL-TIME AUDIO BUFFERING FOR TELEPHONE HANDSETS

(75) Inventors: Paul H. Dietz, Hopkinton, MA (US); William S. Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 273 days.

(21) Appl. No.: 09/864,812

(22) Filed: May 24, 2001

(65) Prior Publication Data

US 2002/0176546 A1 Nov. 28, 2002

(51) Int. Cl.⁷ .............................................. H04M 1/00
(52) U.S. Cl. ................... 379/387.01; 455/334
(58) Field of Search ................. 379/68, 85, 387.01, 379/428.01, 433.02, 433.01, 433.1, 432, 434, 441, 444, 443, 387.02; 455/412, 899, 412.1, 334; 715/500.1

(56) References Cited

U.S. PATENT DOCUMENTS

| | | | | |
|---|---|---|---|---|
| 4,630,262 A | * | 12/1986 | Callens et al. | 370/435 |
| 5,224,151 A | * | 6/1993 | Bowen et al. | 455/569 |
| 5,337,353 A | * | 8/1994 | Boie et al. | 379/433.01 |
| 5,812,951 A | * | 9/1998 | Ganesan et al. | 455/445 |
| 5,828,965 A | * | 10/1998 | Brown et al. | 455/550 |
| 5,867,793 A | * | 2/1999 | Davis | 455/556 |
| 5,956,626 A | * | 9/1999 | Kaschke et al. | 455/115.1 |
| 5,982,764 A | * | 11/1999 | Palermo et al. | 370/345 |

OTHER PUBLICATIONS

Techniques, Perception, and Applications of Time–Compressed Speech, Barry Arons, Proceedings of 1992 Conference, American Voice I/O Society.*

* cited by examiner

*Primary Examiner*—Fan Tsang
*Assistant Examiner*—Ming Chow
(74) *Attorney, Agent, or Firm*—Dirk Brinkman; Andrew J. Curtin

(57) ABSTRACT

A telephone handset dynamically buffers a real-time audio signal. The handset includes a microphone and a speaker connected to a telephone network interface. A proximity sensor is located near the speaker of the handset. The proximity sensor is connected to a circuit for measuring a coupling between the handset and an ear of a user. A buffer continuously records the real-time audio signal. The recorded signal can than be played back after the handset is first removed from the ear of the user, and second re-applied with the ear of the user using a time-compressed audio signal, until the playback signal is resynchronized with the real-time audio signal.

10 Claims, 2 Drawing Sheets

REAL-TIME AUDIO BUFFERING FOR TELEPHONE HANDSETS

FIELD OF THE INVENTION

This invention relates generally to the field of telephone handsets, and more particularly to handsets that provide loss-less telephone communications.

BACKGROUND OF THE INVENTION

There are brief moments when a user of a telephone handset is distracted from a telephone conversations. Examples include interruptions by nearby people, loud background noises, or just unintentional distractions. In many of these cases, the user intentionally removes the handset from his or her ear to perform some other task that requires the use of the hand holding the handset.

In the prior art, two techniques are generally used to provide the user with a capability to receive all of the information in a telephone call. In one method, the incoming call is placed on "hold." This requires that the user notifies the caller to stop the conversation, until the hold is removed. However, in many cases, the user may not want to notify the caller of the need to do something else. The hold function also requires special equipment that may not be available with all handsets. In addition, if the call generated from a recording, placing the call on hold will result in loss of information. Also, in many case, the need for a "hold" cannot be anticipated, or is not realized until after the fact.

The other method uses a "speaker phone." This approach has two problems. First, the quality of a speaker phone call is generally degraded. Second, with a speaker phone, the call is audible by all people within range of the speaker phone. This may not always be desired.

Therefore, there is a need for a method and apparatus that enables loss-less reception of telephone calls, even when the handset is temporarily removed from the ear so that the user cannot hear the telephone call.

SUMMARY OF THE INVENTION

A telephone handset includes an ear proximity sensor to dynamically buffer an incoming audio signals when the handset is removed from the ear. The buffer audio signal is then played back when the handset is returned to the ear. By dropping silent intervals and speeding up the playback of the buffered audio signal with a pitch-preserving process, the buffered audio signal is quickly resynchronized with the real-time incoming audio signal, at which point the buffering of the incoming audio signal stops. This loss-less buffering and instant play-back of the real-time incoming audio signal enables the user to hear all of the audio signal even when the handset has been put down, or the handset is removed from the ear due to any other user activities.

In order to preserve context with the interrupted telephone call, the play-back includes several seconds of content from before when the handset was removed from the ear.

In those cases when the user fails to hear a portion of the call, for whatever reason, the user can simply remove the handset from the ear, and an "instant" replay is effected so that the user can hear the missed portion of the call. If the missed portion of the call was for a longer period, the user can repeatedly remove the handset from the ear. Each time the handset is removed, play-back resumes successively further back in time, allowing the user to replay arbitrarily long segments, within memory limits.

More particularly, a telephone handset is configured to dynamically buffer a real-time audio signal. The handset includes a microphone and a speaker connected to a telephone network interface. A proximity sensor is located near the speaker of the handset. The proximity sensor is connected to a circuit for measuring a coupling between the handset and an ear of a user. A buffer continuously records the real-time audio signal. The recorded signal can than be played back after the handset is first removed from the ear of the user, and second re-applied to the ear of the user using a time-compressed audio signal, until the playback signal is resynchronized with the real-time audio signal.

DETAILED DESCRIPTION OF THE PREFERRED EMBODIMENT

Figure 1:
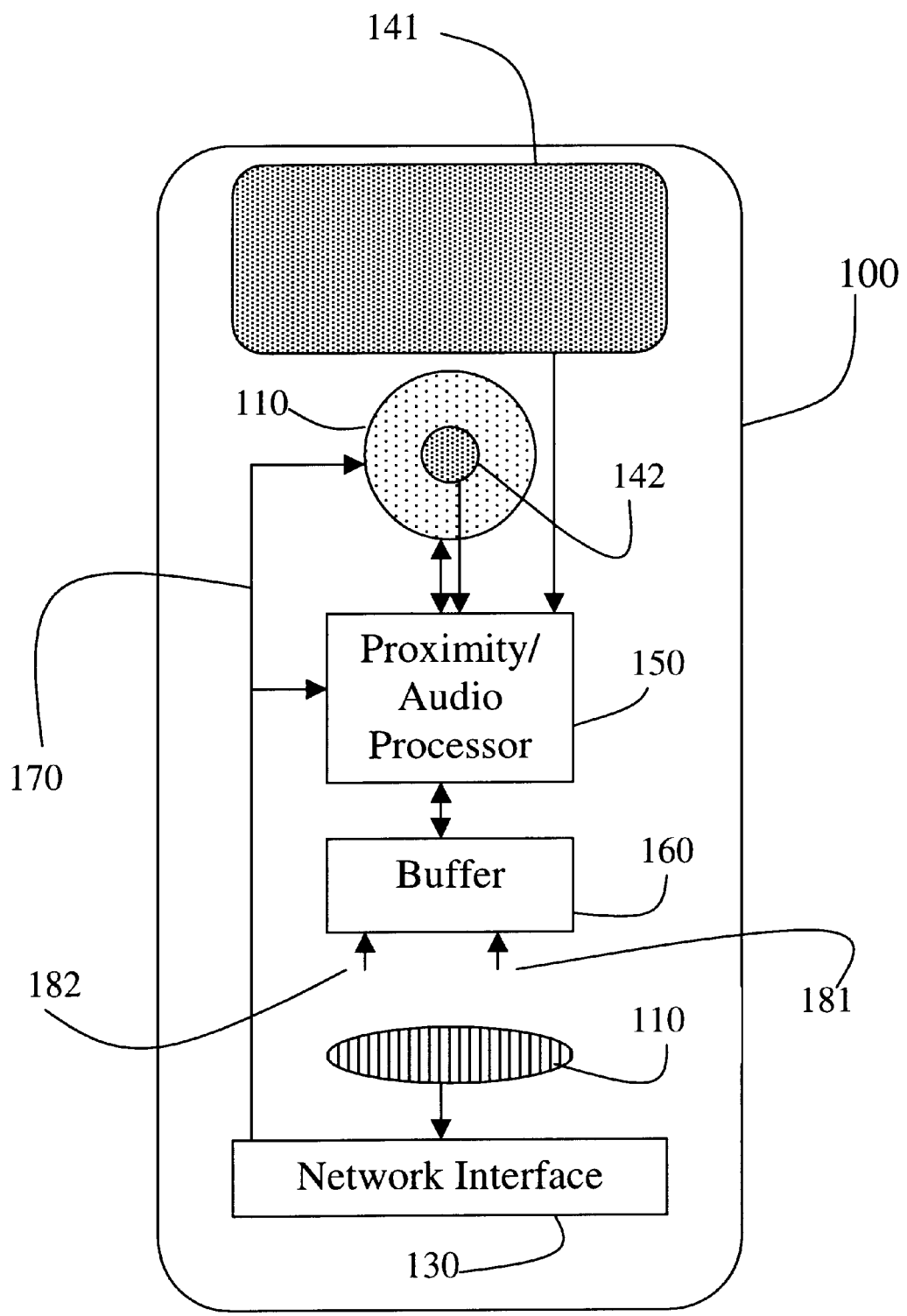
FIG. 1 is a schematic of a telephone handset according to our invention.

FIG. 1 shows a schematic of a telephone handset 100 according to the invention. The handset includes a microphone 110 and a speaker 120 connected to a telephone network interface 130. These are conventional. If the handset 100 is used with an ordinary telephone set, then the network interface 130 is the cord connecting the handset to the telephone set. If the handset is a "cordless" telephone, then the interface is a short-range radio signal. If the handset is a "wireless" telephone, such as PCS, GSM, etc., then the interface is a long-rage radio signal.

The handset also includes a proximity sensor 141–142, a processor 150, and a buffer 160 connected to each other. For convenience, these circuits can be parasitically powered from the telephone line, or by a self-contained power supply of the handset.

The proximity sensor, in part, is in the form of an electro-conductive paint, e.g., MG Chemicals SuperShield™, applied to the interior of the handset to create a large ground electrode 141. The coating can be applied to a large portion of the interior surface of the handset. In a cordless or wireless handset, the ground plane 141 can be the RF shield that is already required to reduce RF interference. A small, isolated ear electrode 142 forms the second part of the proximity sensor. Wires are attached to the electrodes 141–142 with conductive epoxy, e.g., CircuitWorks CW2400.

It should be noted that the proximity sensor can also use a short range infrared detector, a temperature detector, a pressure sensitive pad, ultra-sound range finder, or a mechanical switch that is depressed when in contact with the ear.

Figure 2:
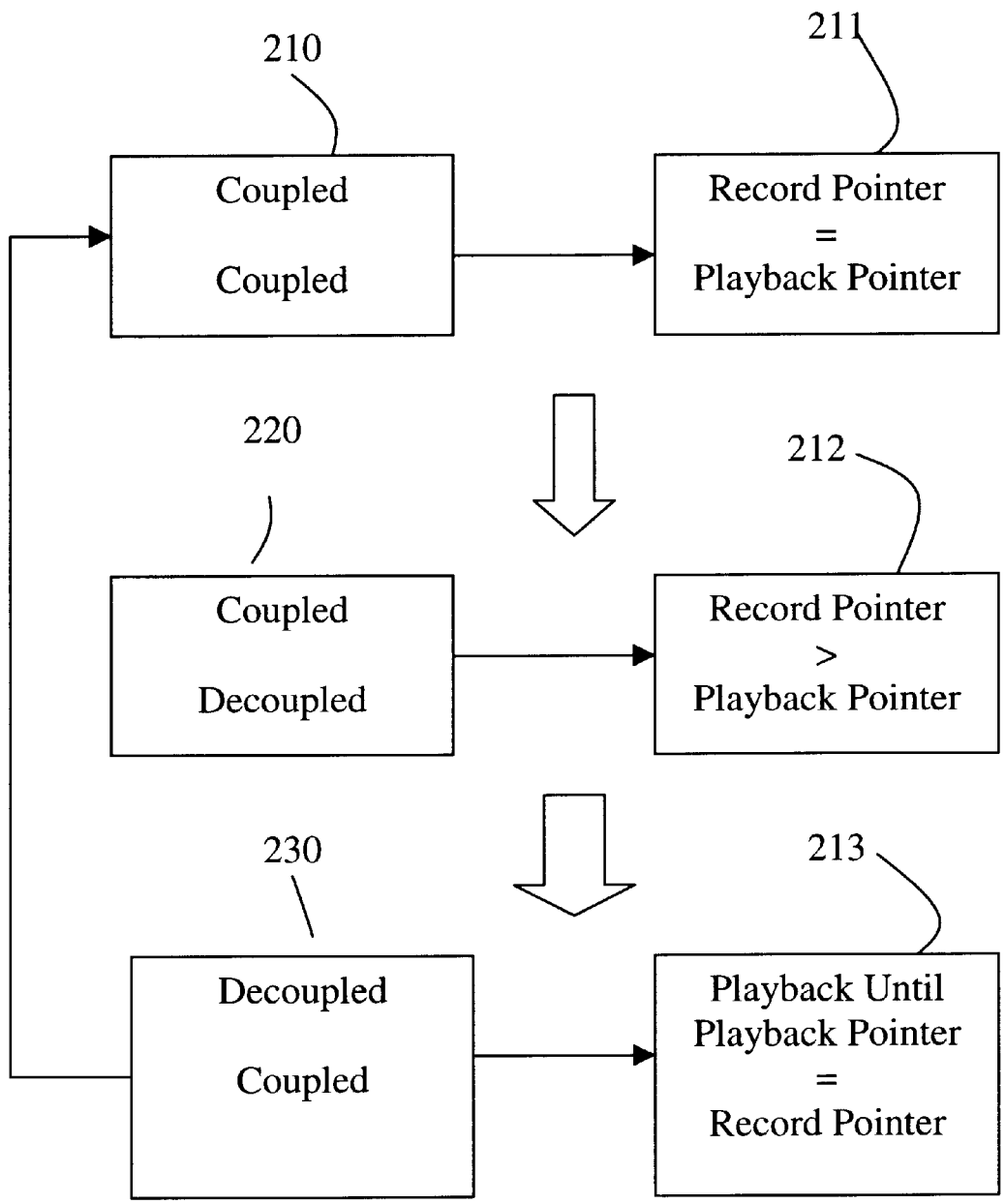
FIG. 2 is a flow diagram of a buffering technique used by the invention.

FIG. 2 shows the basic steps of the method for dynamically buffering telephone calls according to the invention. When the handset is in normal use 210, the user's hand capacitively couples the large ground plane 141 to the small electrode 142 via the user's ear. The capacitive coupling is measured by an A/D circuit of the processor 150. During normal operation, the audio signal on line 170 is fed both to the speaker 110 and the processor 150. The processor stores the signal in the buffer 160 in a circular manner. The buffer uses two pointers, a record pointer 181 and a play-back pointer 182. In this stage, these two pointers are coincident, i.e., the play-back pointer "tracks" 211 the record pointer.

When the processor detects a de-coupling or removal from the ear 220, the play-back pointer 181 is fixed in places while the record pointer continues to advance 212. When, the user later re-applies the handset to the ear to resume the coupling, the stored audio signal is played back from the place indicated by the play-back pointer at a higher rate until the play-back pointer "catches-up" 213 with the record pointer. That is, the play-back audio signal is resynchronized with the real-time audio signal received via the network interface 130.

The play-back is performed in a time-compressed manner. This is done by dropping "silent segments" and using a pitch-preserving time-compression process. The processor 150 first remove periods of silence. The remaining audio signal is grouped into segments of 256 samples, at 16000 samples/sec. During playback 230, every third segment is discarded. This gives a 1.5 times speedup. Other techniques can also be used, see Arons *"Techniques, Perception, and Applications of Time-Compressed Speech,"* In Proceedings of 1992 Conference, American Voice I/O Society, 1992, pp. 169–177.

Because of the buffering, play-back can optionally commence at a time preceding the time marker, for example, the play-back pointer can be stepped-back five seconds in time, before starting play-back so that context of the content can be conserved.

In a digital cellular telephone, real-time buffering can use a source coder, such as Codebook Excited Linear Prediction (CELP), a popular form of a LPC voice compression algorithm. Speech acceleration then becomes a matter of changing the frame time on playback. As an advantage, the audio content is buffered in compressed form, minimizing buffer requirements.

Although the invention has been described by way of examples of preferred embodiments, it is to be understood that various other adaptations and modifications can be made within the spirit and scope of the invention. Therefore, it is the object of the appended claims to cover all such variations and modifications.

We claim:

1. A telephone handset for dynamically buffering a real-time audio signal stream, the telephone handset including a microphone and a speaker connected to a telephone network interface, comprising:

a proximity sensor located near the speaker;

means, connected to the proximity sensor, for measuring a capacitive coupling between the handset and an ear of a user;

a buffer connected to the speaker configured to record real-time audio signals from said stream when the proximity sensor decouples from the ear;

means for playing back the recorded signals as time-compressed audio signals, after the handset is first decoupled from the ear of the user, and second recoupled with the ear of the user until a time-compressed audio signal is resynchronized with a real-time audio signal of said stream to enable loss-less telephone communications; and wherein the buffer further comprises a record pointer and a play back pointer, the record pointer and the playback pointer being synchronized while the handset is coupled to the ear of the user, and the record pointer being greater than the playback pointer when the handset is decoupled, and where the playback pointer advances at a greater rate when the handset is recoupled the ear of the user until the playback pointer is resynchronized with the record pointer.

2. The telephone handset of claim 1 wherein the proximity sensor further comprises:

a ground electrode;

an isolated ear electrode; and a capacitance measuring circuit.

3. The telephone handset of claim 2 wherein the ground electrode is larger than the ear electrode, and the electrodes are in form of an electro-conductive coating applied to an interior portion of the handset.

4. The telephone handset of claim 1 wherein the playback pointer is stepped back in time before playback is commenced.

5. The telephone handset of claim 1 wherein the buffer is circular.

6. The telephone handset of claim 1 further comprising:

means for removing periods of silence in the recorded audio signals;

means for segmenting a remaining of recorded audio signals into remaining segments; and means for discarding a predetermined fraction of the remaining segments during playback of the recorded audio signals.

7. The telephone handset of claim 1 wherein the handset is part of a cellular telephone, and the buffer is connected to a source coder to compress the recorded audio signals in the buffer.

8. The telephone handset of claim 7 wherein the means for playback changes a time frame during playback.

9. The telephone handset of claim 1 wherein the proximity sensor further comprises:

a mechanical switch; and a circuit for measuring a state of the switch.

10. A method for dynamically buffering a real-time audio signal stream received in a telephone handset including a microphone and a speaker connected to a telephone network comprising:

recording real-time audio signals of said stream in a buffer;

measuring a capacitive coupling between the handset and an ear of a user; and playing back the recorded signal as time-compresseds audio signals, after the handset is first removed from the ear of the user, and second re-applied to the ear of the user until a time-compressed audio sign resynchronized with a real-time audio signal, wherein the buffer further comprises a record pointer and a play back pointer, the record pointer-and the playback pointer being synchronized while the handset is coupled to the ear of the user, and the record pointer being greater than the playback pointer when the handset is decoupled, and where the playback pointer advances at a greater rate when the handset is recoupled the ear of the user until the playback pointer is resynchronized with the record pointer.

* * * * *